United States Patent
Yu et al.

(10) Patent No.: US 9,160,599 B2
(45) Date of Patent: Oct. 13, 2015

(54) METHOD AND APPARATUS FOR CHANNEL SMOOTHING AND ESTIMATION IN OFDM SYSTEM

(71) Applicant: Samsung Electronics Co., Ltd., Gyeonggi-do (KR)

(72) Inventors: Chunyang Yu, Cambridge (GB); Fei Tong, Royston (GB); Paul C. McFarthing, Cambridge (GB)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/095,553

(22) Filed: Dec. 3, 2013

(65) Prior Publication Data

US 2015/0043665 A1    Feb. 12, 2015

Related U.S. Application Data

(60) Provisional application No. 61/864,938, filed on Aug. 12, 2013.

(51) Int. Cl.
*H04L 27/26* (2006.01)

(52) U.S. Cl.
CPC .......... *H04L 27/265* (2013.01); *H04L 27/2656* (2013.01); *H04L 27/2671* (2013.01); *H04L 27/2695* (2013.01)

(58) Field of Classification Search
CPC ............ H04L 27/2647; H04L 27/2662; H04L 27/2675; H04L 27/2657; H04L 25/0202; H04L 25/022; H04L 25/0212; H04L 27/2665; H04L 25/0228; H04L 27/265; H04L 27/2656; H04L 27/2695; H04L 27/2671; H04J 11/00; H04W 56/00

See application file for complete search history.

(56) References Cited

U.S. PATENT DOCUMENTS

| | | | |
|---|---|---|---|
| 2003/0016773 A1* | 1/2003 | Atungsiri et al. | 375/355 |
| 2006/0171297 A1* | 8/2006 | Ghosh | 370/210 |
| 2007/0019763 A1* | 1/2007 | Kim et al. | 375/346 |
| 2007/0153926 A1* | 7/2007 | Arslan et al. | 375/260 |
| 2007/0201544 A1* | 8/2007 | Zhu et al. | 375/229 |

* cited by examiner

*Primary Examiner* — Vineeta Panwalkar
(74) *Attorney, Agent, or Firm* — The Farrell Law Firm, P.C.

(57) ABSTRACT

Methods and apparatus are provided for receiving packets on a channel of an Orthogonal Frequency Division Multiplexing (OFDM) system. A time shift value for a packet is estimated using a channel estimation and an FFT size. A synchronization position of the packet on a channel is adjusted using the estimated time shift value, and a filter is applied to the adjusted channel to generate a smoothed channel estimate. Alternatively, a channel with a corrected packet synchronization position is estimated, and a smoothed channel is estimated by applying a filter to the estimated channel. Packets are received on the channel, at a receiver of the OFDM receiving apparatus, in accordance with the estimated smoothed channel.

15 Claims, 12 Drawing Sheets

METHOD AND APPARATUS FOR CHANNEL SMOOTHING AND ESTIMATION IN OFDM SYSTEM

PRIORITY

This application claims priority under 35 U.S.C. 119(e) to U.S. Provisional Patent Application No. 61/864,938, which was filed on Aug. 12, 2013, the contents of which are incorporated herein by reference.

BACKGROUND OF THE INVENTION

1. Field of the Invention

The present invention relates generally to channel estimation in an Orthogonal Frequency Division Multiplexing (OFDM) receiving apparatus, and more particularly, to providing a robust synchronization position adjustment algorithm to improve channel estimation in an OFDM receiving apparatus.

2. Description of the Related Art

FIG. 1 is a diagram illustrating an OFDM system, which includes an OFDM transmitting apparatus 102 and an OFDM receiving apparatus 110. The OFDM transmitting apparatus 102 receives data for modulation in a modulation unit 104. The modulated data is provided to an Inverse Fast Fourier Transform (IFFT) unit 106 and then a digital to analog conversion unit 108. A baseband OFDM signal is then transmitted from the OFDM transmitting apparatus 104. The baseband OFDM signal is received at an analog to digital conversion unit 112 of the OFDM receiving apparatus 110 and then provided to a Fast Fourier Transform (FFT) unit 114 before demodulation in a demodulation unit 116. Data is then output from the demodulation unit 116 of the OFDM receiving apparatus 110.

Accurate channel estimation is a crucial factor in the performance of a Physical (PHY) layer in an OFDM system. Channel estimation is typically performed between FFT and demodulation in the OFDM receiving apparatus. A channel may be estimated with training field preambles, such as, for example, Legacy Long Training Field (L_LTF), High Throughput Long Training Field (HT_LTF), and Very High Throughput Long Training Field (VHT_LTF) in Institute of Electrical and Electronics Engineers (IEEE) 802.11a/g, IEEE 802.11n, and IEEE 802.11ac, respectively. Zero forcing is an algorithm that is commonly adopted to estimate channel response along all used subcarriers. Zero forcing channel estimation does not exploit coherence among neighboring subcarriers, which increases estimation errors, especially when white Gaussian noise is presented.

In Jan-Jaap Van De Beek et al., "On Channel Estimation in OFDM System," Proceedings of the IEEE Vehicular Technology Conference, July 1995, pp. 815-819, a Minimum Mean Square Error (MMSE) algorithm is proposed to obtain optimal linear estimation by exploiting the correlation between subcarriers. However, this solution is impractical to implement in hardware due to its high complexity.

Attempts to obtain suboptimal solutions have also been made, such as in Darryn Lowe and Xiaojing Huang, "Adaptive Low-Complexity MMSE Channel Estimation for OFDM," 2006 International Symposium on Communications and Information Technologies (ISCIT), Bangkok, Thailand, 18-20 Oct. 2006, and Hsuan Yu Liu et al., "Combining Adaptive Smoothing and Decision-Directed Channel Estimation Schemes for OFDM WLAN Systems," Proceedings of the 2003 International Symposium on Circuits and Systems, pp. 149-152. However, these proposals assume an ideal synchronization position for a packet, which is very difficult to achieve, especially in fading channel or multiple transmitter scenarios due to the well-known pseudo-multipath problem, even though some attempts have been made to improve it. See, e.g., U.S. patent application Ser. No. 12/617,537, filed Nov. 12, 2009.

Although current synchronization in an OFDM wireless Local Area Network (LAN) cannot accurately detect the exact start of each symbol of an OFDM packet, this may not cause a serious problem due to the existence of a guard interval. A packet offset is introduced to start FFT data sampling within the guard interval to mitigate the effects of an inaccurate sync position. However, when there is an error in synchronization, the channel will no longer be flat for an Additive White Gaussian Noise (AWGN) channel, as both the real and imaginary parts will display sinusoidal oscillation. Applying a smoothing filter, which is not optimal for such synchronization error, to such an oscillating channel can introduce distortion. The above-described phenomenon becomes even more serious for a multiple transmitter antennas scenario due to synchronization uncertainty from the pseudo-multipath phenomenon caused by cyclic shift.

SUMMARY OF THE INVENTION

The present invention has been made to address at least the above problems and/or disadvantages and to provide at least the advantages described below. Accordingly, an aspect of the present invention provides a robust synchronization position adjustment algorithm with low hardware complexity to improve channel estimation in an OFDM receiving apparatus.

According to one aspect of the present invention, a method is provided for receiving packets on a channel of an OFDM system at an OFDM receiving apparatus. A time shift value for a packet is estimated using channel estimation and an FFT size. A synchronization position of the packet on a channel is adjusted using the estimated time shift value. A filter is applied to the adjusted channel to generate a smoothed channel estimate. Packets are received on the channel, at a receiver of the OFDM receiving apparatus, in accordance with the smoothed channel estimate.

According to another aspect of the present invention, a method is provided for receiving packets on a channel of an OFDM system at an OFDM receiving apparatus. A time shift value for a packet is estimated using channel estimation and an FFT size. A channel with a corrected packet synchronization position is estimated using the channel estimation, the FFT size, and the estimated time shift value. A smoothed channel is estimated by applying a filter to the estimated channel. Packets are received on the channel, at a receiver of the OFDM receiving apparatus, in accordance with the estimated smoothed channel.

According to an additional aspect of the present invention, an apparatus is provided for receiving packets on a channel of an OFDM system. The apparatus includes a memory. The apparatus also includes at least one processor coupled to the memory and operative to: estimate a time shift value for a packet using channel estimation and an FFT size; adjust a synchronization position of the packet on a channel using the estimated time shift value; and applying a filter to the adjusted channel to generate a smoothed channel estimate. The apparatus further includes a receiver coupled to the at least one processor and operative to receive packets on the channel in accordance with the smoothed channel estimate.

According to a further aspect of the present invention, an apparatus is provided for receiving packets on a channel of an OFDM system. The apparatus includes a memory. The apparatus also includes at least one processor coupled to memory and operative to: estimate a time shift value for a packet using channel estimation and an FFT size; estimate a channel with a corrected packet synchronization position using the channel estimation, the FFT size, and the estimated time shift value; and estimate a smoothed channel by applying a filter to the estimated channel. The apparatus further includes a receiver coupled to the at least one processor and operative to receive packets on the channel in accordance with the estimated smooth channel.

According to another aspect of the present invention, an article of manufacture is provided for receiving packets on a channel of an OFDM system. The article of manufacture includes a machine readable medium containing one or more programs, which when executed implement the steps of: estimating a time shift value for a packet using channel estimation and an FFT size; adjusting a synchronization position of the packet on a channel using the estimated time shift value; applying a filter to the adjusted channel to generate a smoothed channel estimate; and receiving packets on the channel in accordance with the smoothed channel estimate.

Additionally, according to an aspect of the present invention, an article of manufacture is provided for receiving packets on a channel of an OFDM system. The article of manufacture includes a machine readable medium containing one or more programs, which when executed implement the steps of: estimating a time shift value for a packet using channel estimation and an FFT size; estimating a channel with a corrected packet synchronization position using the channel estimation, the FFT size, and the estimated time shift value; estimating a smoothed channel by applying a filter to the estimated channel; and receiving packets on the channel in accordance with the estimated smoothed channel.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE INVENTION

Figure 1:
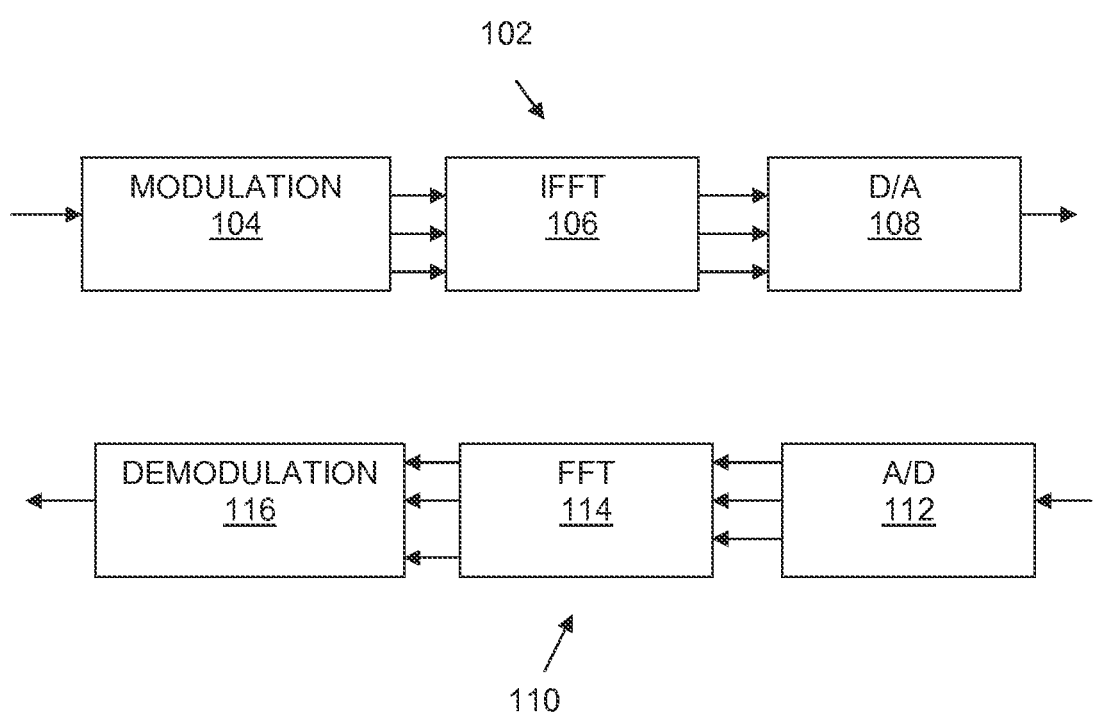
FIG. 1 is a diagram illustrating an OFDM system.

Embodiments of the present invention are described in detail with reference to the accompanying drawings. In the following description, specific details, such as detailed configuration and components, are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

According to embodiments of the present invention, a robust synchronization position adjustment algorithm with low hardware implementation complexity is provided for an OFDM receiving apparatus, which is based on comparing a power of an earliest finger in a power delay profile with a set of hypothetical time delays. A conventional method to solve the same problem requires an IFFT and an estimation of the peak delay of the power delay profile. A solution according to embodiments of the present invention can be implemented by time multiplexing common hardware (for various time delays), which results in a smaller hardware size and flexibility for finer adjustment resolution.

Timing errors always exists in real implementations of OFDM wireless LAN synchronizers due to the following reasons:

(1) Fractional packet delay in the Analog to Digital Converter (ADC) and filters.

(2) For 40 MHz, 80 MHz and 160 MHz bandwidths, synchronization may be carried out on a 20 MHz signal in the hardware implementation, which introduces ambiguity in the synchronization position, for example, in 80 MHz, 1 to 3 synchronization sample errors can occur.

(3) In a fading channel, multipath causes late false peaks in the LTF cross correlation profile, which disrupt frame timing estimation.

(4) In multiple transmitter antennas, the cyclic shift introduced to avoid beamforming causes multiple peaks in the LTF cross correlation profile, which disrupt frame timing estimation (pseudo-multipath problem).

If a timing error exceeds a guard interval size, incorrect FFT results will be produced, since the cyclic prefix feature is lost. Due to the existence of various SIGNAL fields, such as, for example, Legacy Signal (L_SIG), High Throughput Signal (HT_SIG), Very High Throughput Signal A (VHT_SIGA), and Very High Throughput Signal B (VHT_SIGB), which are modulated by Binary Phase Shift Keying (BPSK) without puncturing, and are consequently robust to various imperfections, a large enough time gap exists to estimate and apply a sampling adjustment before actual channel smoothing is performed to reduce distortion. Thus, even if an initial sync position is far from optimal, the signaling field is protected and can survive the suboptimal channel estimate with the error correction capability of decoder. As long as packet adjustment is carried out before the actual payload starts, packet decoding will be improved.

According to an embodiment of the present invention, a simple filter is applied after this packet adjustment to generate a smoothed channel estimate. The tap length of the filter can be varied based on the Signal to Noise Ratio (SNR). This is based on the assumption channel variation is not rapid after packet adjustment.

As described in further detail below, embodiments of the present invention can improve the MSE of channel estimation by about 6 decibels (dB), which translates into a sensitivity improvement of approximately 1 to 1.5 dB for multiple transmit chains. For single transmit chain, the sensitivity improvement is approximately 0.2 to 0.3 dB.

The channel estimation and smoothing algorithm according to an embodiment of the present invention comprises two steps:
(1) Estimate the best sample offset adjustment using Equation (1) below.
(2) Smooth the channel estimation after sample offset adjustment.

$$\tau_{opt} = \arg\max_{-\tau_{max} \leq \tau \leq \tau_{max}} \left| \sum_{k=-N/2}^{N/2-1} H_f^{ZF}(k) \exp\left(-j\frac{2\pi}{N}k\tau\right) \right| \quad (1)$$

In Equation (1), N is the FFT size, $H_f^{ZF}(k)$ is the initial zero forcing channel estimation, and $\tau$ and $\tau_{max}$ are a time shift value and maximum allowed time offset value, respectively. Both $\tau$ and $\tau_{max}$ are time shift normalized by the sampling interval. While zero forcing channel estimation is used in this embodiment of the present invention, alternate embodiments of the present invention may utilize any channel estimation method that achieves similar results. The channel estimation after the sample offset adjustment is set forth below in Equation (2).

$$H_f^{SA}(k) = \sum_{k=-N/2}^{N/2-1} H_f^{ZF}(k) \exp\left(-j\frac{2\pi}{N}k\tau_{opt}\right) \quad (2)$$

After obtaining the optimal sample offset adjustment, the channel estimate becomes quite smooth for an AWGN channel. A filter is then applied across sub-carriers to obtain the smoothed channel estimate. The filter may be embodied as a Finite Impulse Response (FIR) filter. While an FIR filter is used in this embodiment of the present invention, alternate embodiments of the present invention may utilize any filter that achieves similar results. The FIR filter is configured to have a length that is based on an SNR estimate. According to an embodiment of the present invention, a short length FIR filter is adopted to avoid excessive distortion when the SNR estimate is greater than or equal to high threshold, a long length FIR filter is adopted for noise compression when the SNR estimate is less than or equal to a low threshold, and a medium length FIR filter is adopted when the SNR estimate is between the low and high thresholds, as set forth below in Equation (3).

$$h_m = \begin{cases} [111111111]/9 & SNR \leq 3 \text{ dB} \\ [1111111]/7 & 3 \text{ dB} < SNR \leq 12 \text{ dB} \\ [11111]/5 & SNR > 12 \text{ dB} \end{cases} \quad (3)$$

According to an embodiment of the present invention, the receiver can adjust a position of the packet for synchronization based on the time offset calculated in Equation (1). Following synchronization the filter is directly applied to the adjusted channel to generate the smoothed channel estimate.

Alternatively, in another embodiment of the present invention, the receiver does not adjust the position of the packet, but instead estimates the channel after packet adjustment in accordance with Equation (2), and estimates the smoothed channel in accordance with Equations (4) and (5) below.

$$\widetilde{H}(k) = \sum_{m=1}^{M} h_m H_f^{SA}(k + m - (M+1)/2) \quad (4)$$

$$H(k) = \widetilde{H}(k) \exp\left(j\frac{2\pi}{N}k\tau_{opt}\right) \quad (5)$$

In Equation (4), M is the FIR filter length, which can be 5, 7, or 9 taps based on the SNR estimate.

Figure 2:
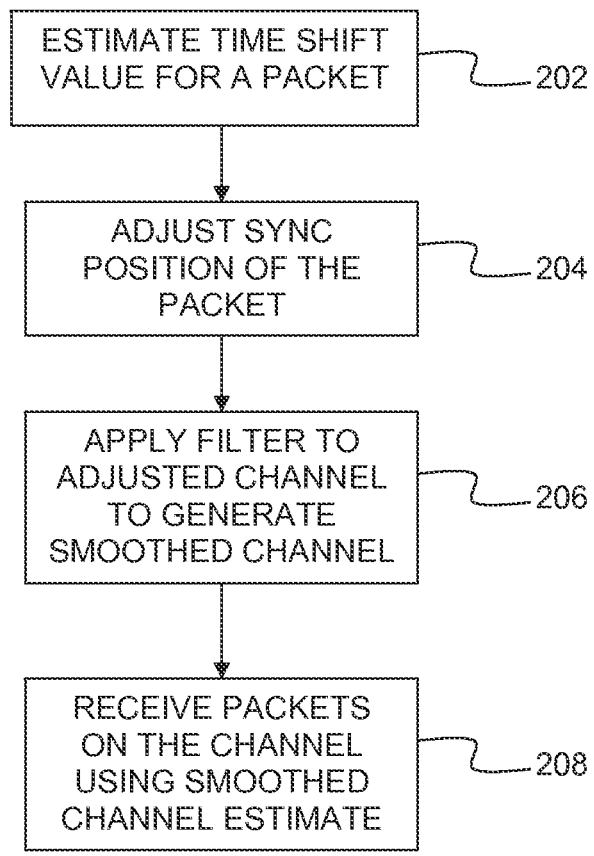
FIG. 2 is a flow diagram illustrating a method for receiving packets on a channel of an OFDM system, according to an embodiment of the present invention.

Referring to FIG. 2, a flow diagram illustrates a method for receiving packets on a channel of an OFDM system, according to an embodiment of the present invention. Specifically, FIG. 2 relates to the embodiment described above in which the packet position is adjusted based on the delay estimation. In step 202, a time shift value is estimated for a packet using channel estimation and an FFT size. For example, the time shift value is estimated in accordance with the synchronization position adjustment algorithm in Equation (1) above. Channel estimation may be embodied as zero forcing channel estimation, and the time shift value is estimated from within an allowed time offset. As described above, alternate embodiments of the present invention may utilize any channel estimation method that achieves similar results. The estimated time shift value is an estimated bias of an OFDM packet from a synchronization position, and thus, represents an amount of time an OFDM packet must be adjusted in order to achieve synchronization.

In step 204, a position of the OFDM packet in a channel is adjusted using the estimated time shift value in order to achieve synchronization. In step 206, a filter is applied to the adjusted channel to generate a smoothed channel estimate. More specifically, the filter is applied across sub-carriers to perform channel smoothing. In an embodiment of the present invention described above, an FIR filter is applied that has a length based on an SNR estimate for the channel. More specifically, a short length FIR filter is applied when the SNR is greater than or equal to a high threshold, a long length FIR filter is applied when the SNR is less than or equal to a low threshold, and a medium length FIR filter is applied when the SNR is between high and low thresholds. As described above, alternate embodiments of the present invention may utilize any filter that achieves similar results. In step 208, packets are received on the channel using the smoothed channel estimate.

Figure 3:
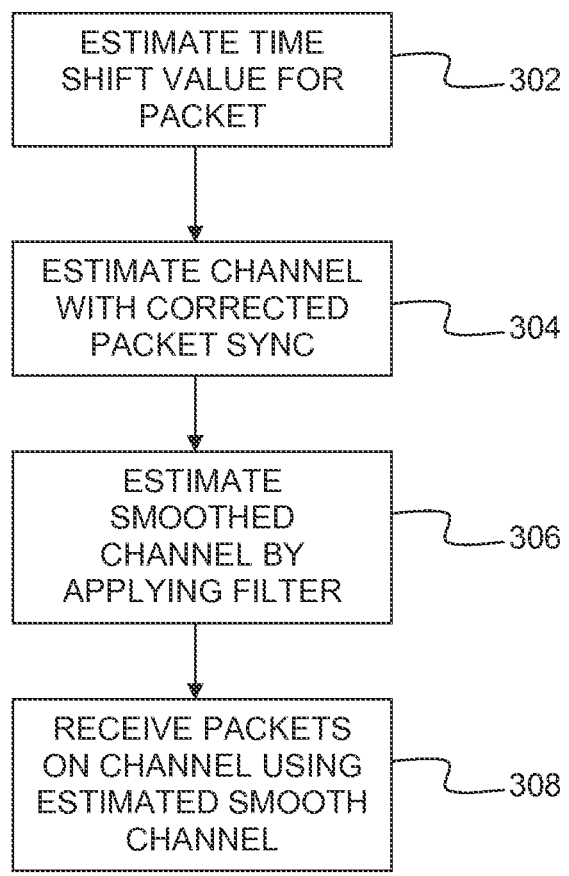
FIG. 3 is a flow diagram illustrating a method for receiving packets on a channel of an OFDM system, according to another embodiment of the present invention.

Referring now to FIG. 3, a flow diagram illustrates a method for receiving packets on a channel of an OFDM system, according to another embodiment of the present invention. Specifically, FIG. 3 relates to the embodiment in which the packet position is not adjusted. In step 302, a time shift value is estimated for a packet using channel estimation and an FFT size. Step 302 of FIG. 3 is substantially identical to step 202 of FIG. 2, which utilizes Equation (1), as described above.

In step 304, a channel is estimated having a corrected packet synchronization position using the channel estimation, the FFT size, and the estimated time shift value. Specifically, the channel is estimated using Equation (2) above, where channel estimation is embodied as zero forcing channel estimation. As described above, alternate embodiments of the present invention may utilize any channel estimation method that achieves similar results.

In step 306, a smoothed channel is estimated by applying a filter to the estimated channel. Specifically, the smoothed channel is estimated in accordance with Equations (3)-(5), above. The filter may be embodied as an FIR filter having a length based on an SNR estimate, as described above with respect to FIG. 2. As described above, alternate embodiments of the present invention may utilize any filter that achieves similar results. In step 308, packets are received on the channel in accordance with the estimated smoothed channel.

Figure 4:
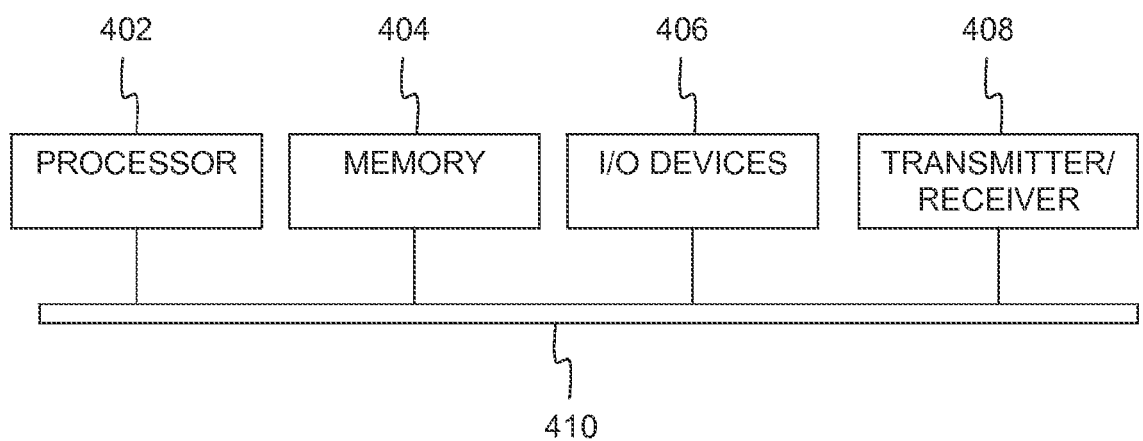
FIG. 4 is a block diagram illustrating an illustrative hardware implementation of a computing system in accordance with which one or more methodologies of the present invention may be implemented.

Referring now to FIG. 4, a block diagram illustrates an illustrative hardware implementation of a computing system in accordance with which one or more methodologies of the invention (e.g., methodologies described in the context of FIGS. 2 and 3) may be implemented. Specifically, according to an embodiment of the present invention, the block diagram of FIG. 4 may relate to a OFDM receiving apparatus in an OFDM system. As shown, the computing system may be implemented in accordance with a processor 402, a memory 404, I/O devices 406, and a transmitter/receiver 408, coupled via a computer bus 410 or alternate connection arrangement.

It is to be appreciated that the term "processor" as used herein is intended to include any processing device, such as, for example, one that includes a Central Processing Unit (CPU) and/or other processing circuitry. It is also to be understood that the term "processor" may refer to more than one processing device and that various elements associated with a processing device may be shared by other processing devices. The term "memory" as used herein is intended to include a memory associated with a processor or CPU, such as, for example, Ramdom Access Memory (RAM), Read Only Memory (ROM), a fixed memory device (e.g., hard drive), a removable memory device, flash memory, etc.

In addition, the phrase "I/O devices" as used herein is intended to include, for example, one or more input or output devices. Still further, the phrase "transmitter/receiver" as used herein is intended to include, for example, one or more transmitters and receivers to permit the computer system to communicate with another computer system via an appropriate communications protocol. Accordingly, in an embodiment of the present invention, the OFDM receiving apparatus is provided access to an OFDM system, and is able to receive OFDM packets over one or more channels.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Embodiments of the present invention may be utilized in conjunction with the manufacture of integrated circuits. Regarding integrated circuits in general, a plurality of identical die is typically formed in a repeated pattern on a surface of a semiconductor wafer. Each die may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

To illustrate the performance improvement of embodiments of the present invention over zero forcing channel estimation and the existing smoothing strategy, which is an adaptive FIR filter shown in Equation (6), two criteria are used: Mean Square Error (MSE) between an estimated channel and an ideal channel under AWGN, and Packet Error Rate (PER).

$$h^{old}(m) = \begin{cases} [0.1344 \quad 0.2312 \quad 0.2688 \quad 0.2312 \quad 0.1344] & SNR < 3 \text{ dB} \\ [0.0957 \quad 0.25 \quad 0.3086 \quad 0.25 \quad 0.0957] & 3 \text{ dB} \leq SNR < 7 \text{ dB} \\ [0.0303 \quad 0.2803 \quad 0.3788 \quad 0.2803 \quad 0.0303] & 7 \text{ dB} \leq SNR < 12 \text{ dB} \\ [-0.0459 \quad 0.3165 \quad 0.4587 \quad 0.3165 \quad -0.0459] & 12 \text{ dB} \leq SNR < 20 \text{ dB} \\ [-0.0918 \quad 0.3367 \quad 0.5102 \quad 0.3367 \quad -0.0918] & 20 \text{ dB} \leq SNR < 30 \text{ dB} \\ [0 \quad 0 \quad 1 \quad 0 \quad 0] & \text{otherwise} \end{cases} \quad (6)$$

A flat channel is first assumed for a 20 MHz bandwidth 802.11a packet. Various levels of white Gaussian noise are added to the clean channel, and an offset of 3.2 sample offsets is applied. FIG. 4 shows the performance comparison between embodiments of the present invention and zero forcing channel estimation without channel smoothing. The simulation results are based on 1000 simulations for each SNR point. In searching for the optimal packet offset, the fine resolution is half of the packet time duration.

Figure 5:
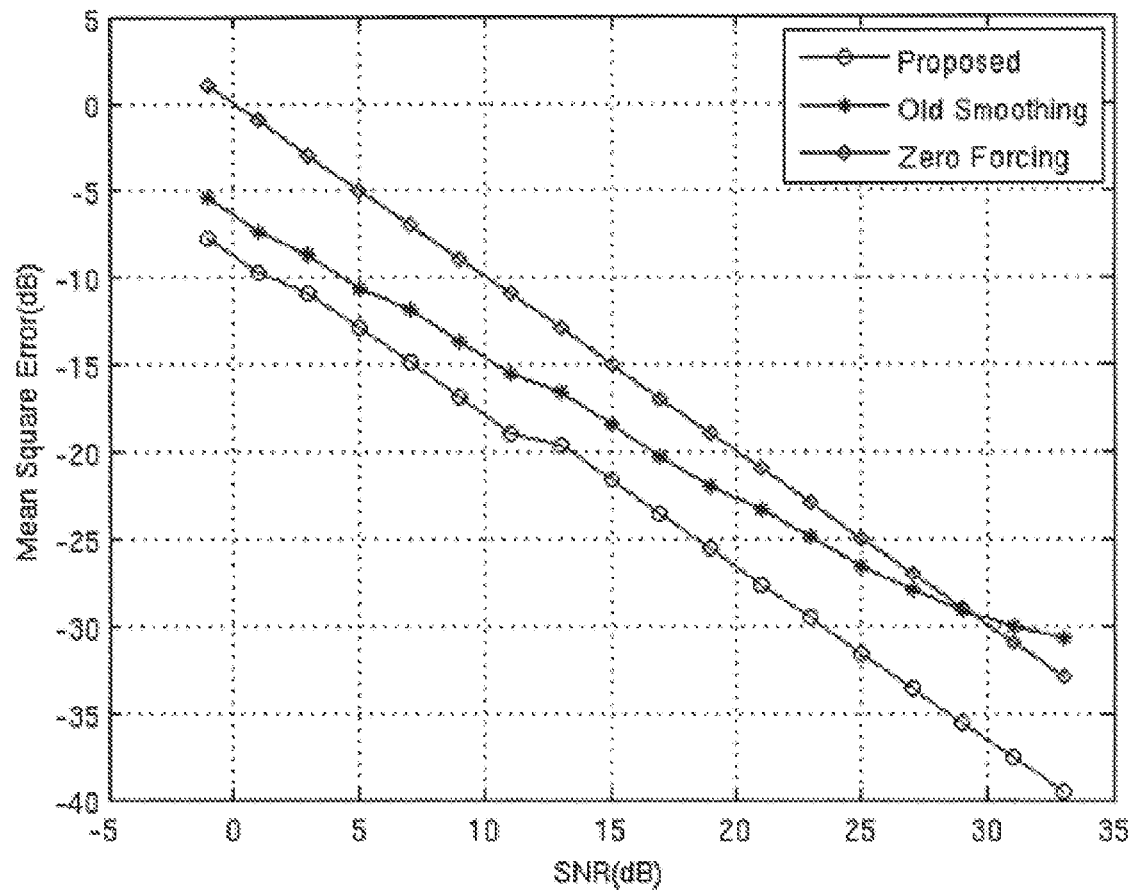
FIG. 5 shows Mean Square Error (MSE) performance degradation for various channel estimation methods, including one according to an embodiment of the present invention.

As shown in FIG. 5, the MSE performance degradation in the proposed algorithm occurs at 3 dB and 12 dB due to the change in the filter tap length. When compared with a 9-tap FIR filter, the 5-tap FIR filter has about 1 to 2 dB degradation. Filter length should depend on the channel coherence time, i.e., the longer the coherence time, the longer average that can be applied. To minimize implementation complexity and the effect of the FIR filter on a fading channel, a fixed 5-tap filter can be selected. As described in greater detail below, this does not result in significant performance degradation.

Figure 6:
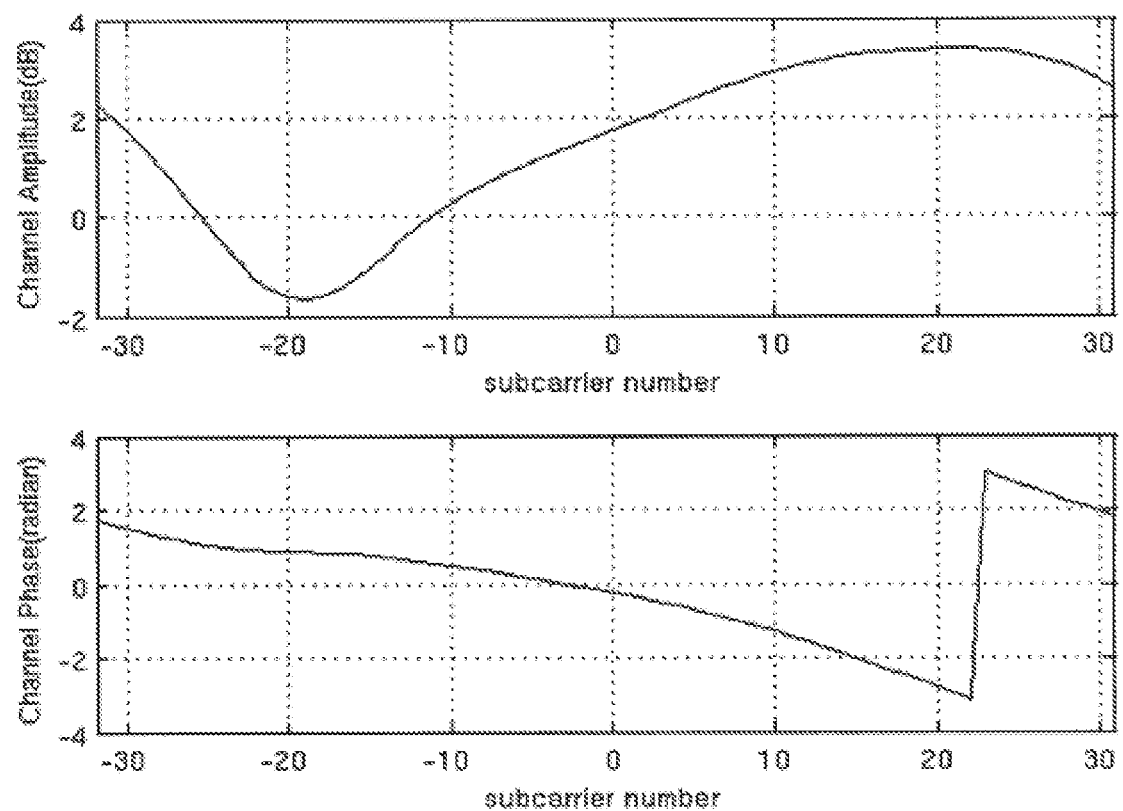
FIG. 6 shows an E-type fading channel generated using the IEEE fading channel model.
Figure 7:
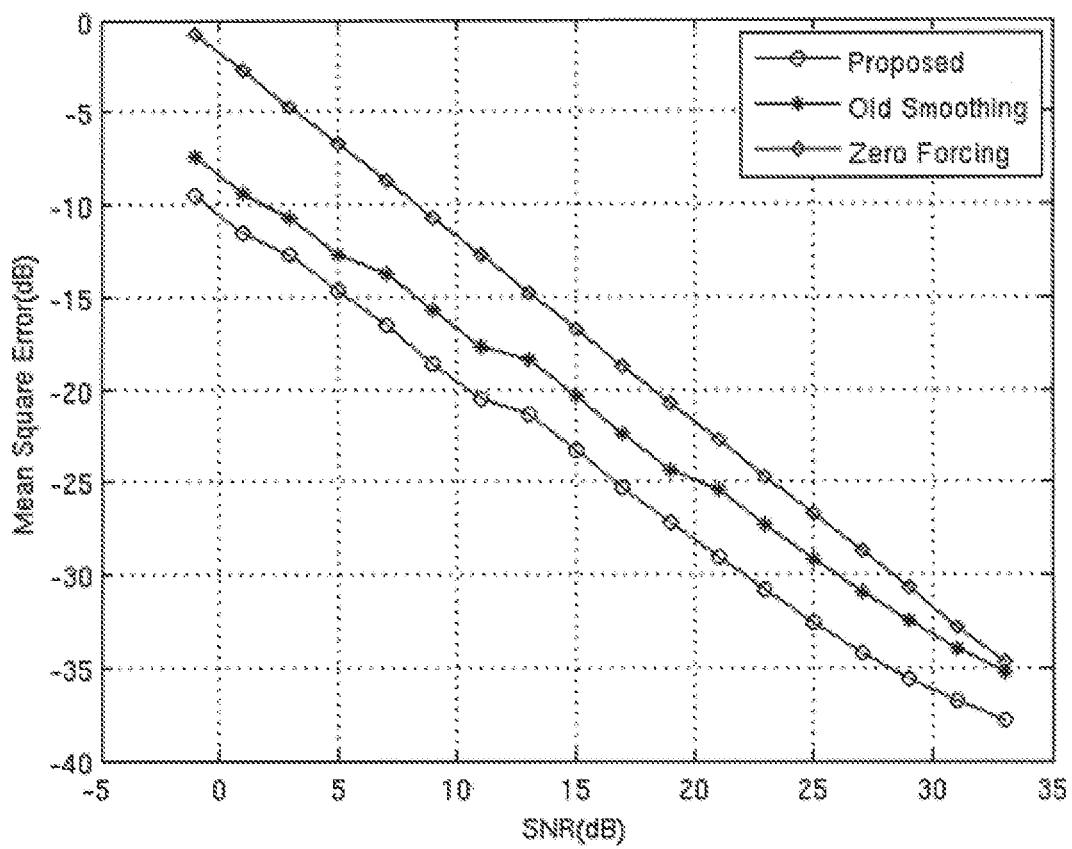
FIG. 7 compares MSE for various estimation methods in the E-type fading channel, including one according to an embodiment of the present invention.

To test the effectiveness of embodiments of the present invention on a fading channel, an E-type fading channel is generated using an IEEE fading channel model, as shown in FIG. 6, as amplitude and phase response, respectively. An offset of 2.4 packets is applied, and various MSE results are calculated and shown in FIG. 7. Consistently, a 7-8 dB gain in MSE is obtained, similar to that which is shown in FIG. 5. The gain is slightly smaller for a high SNR.

Figure 8:
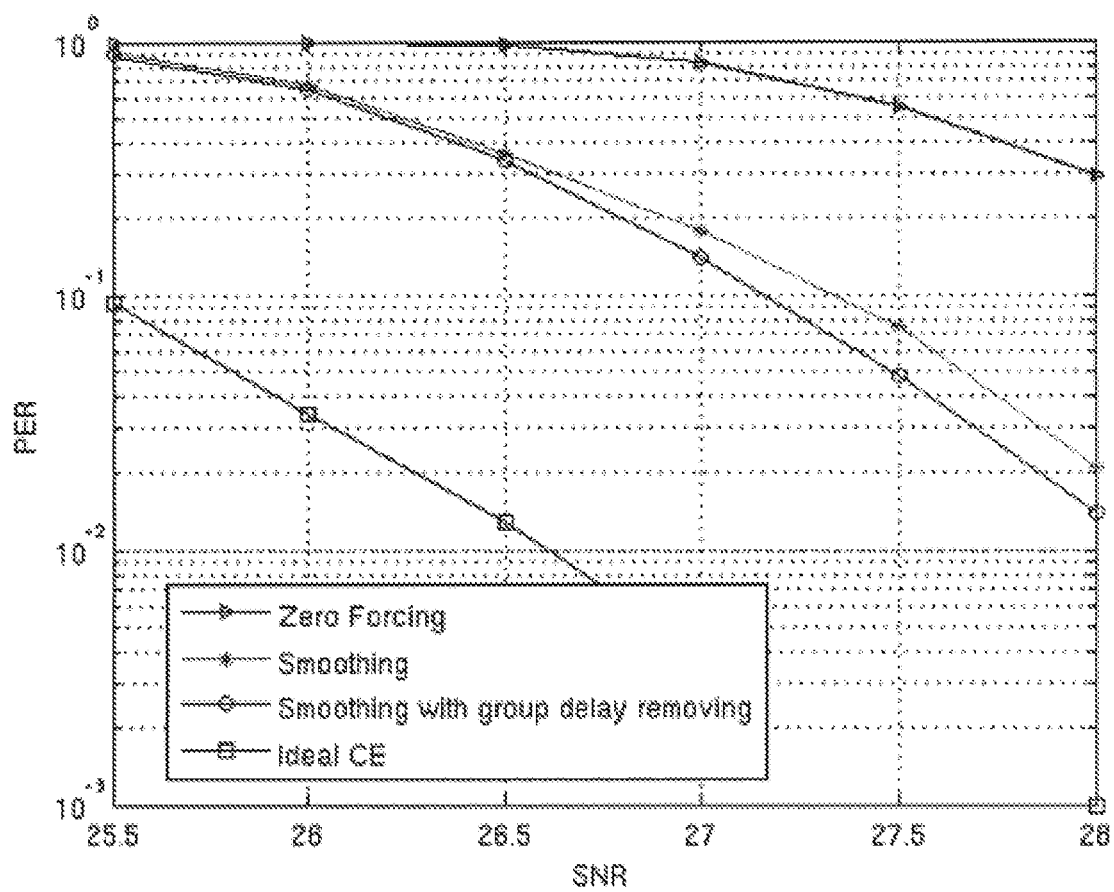
FIG. 8 shows packet error rate for a single spatial stream, 80 Mega Hertz (MHz) Very High Throughput (VHT) Modulation and Coding Scheme-7 (MCS7) packet in an AWGN channel, according to an embodiment of the present invention.

In the following simulations, packets with a fixed payload of 1000 bytes of random data are used. A random number of zero packets, uniformly distributed zeros in the range [1, 20], are added to the beginning of each transmitted waveform to model synchronization ambiguity over the 20 MHz bandwidth. The results for each SNR point are based on 1000 packet simulations unless otherwise stated. The SCSC Matlab receiver model is used throughout. The following 4 scenarios are compared:

(1) Single spatial stream, 80 MHz VHT MCS7 packet, in an AWGN channel, with the results shown in FIG. 8.
(2) 80 MHz VHT MCS9 packet with STBC, in an AWGN channel, with the results shown in FIG. 9.
(3) 2 spatial stream, 80 MHz VHT MCS9 packet, in an AWGN channel, with the results shown in FIG. 10.
(4) 2 spatial stream, 80 MHz VHT MCS0 packet, in an AWGN channel, with the results shown in FIG. 11.

Figure 12:
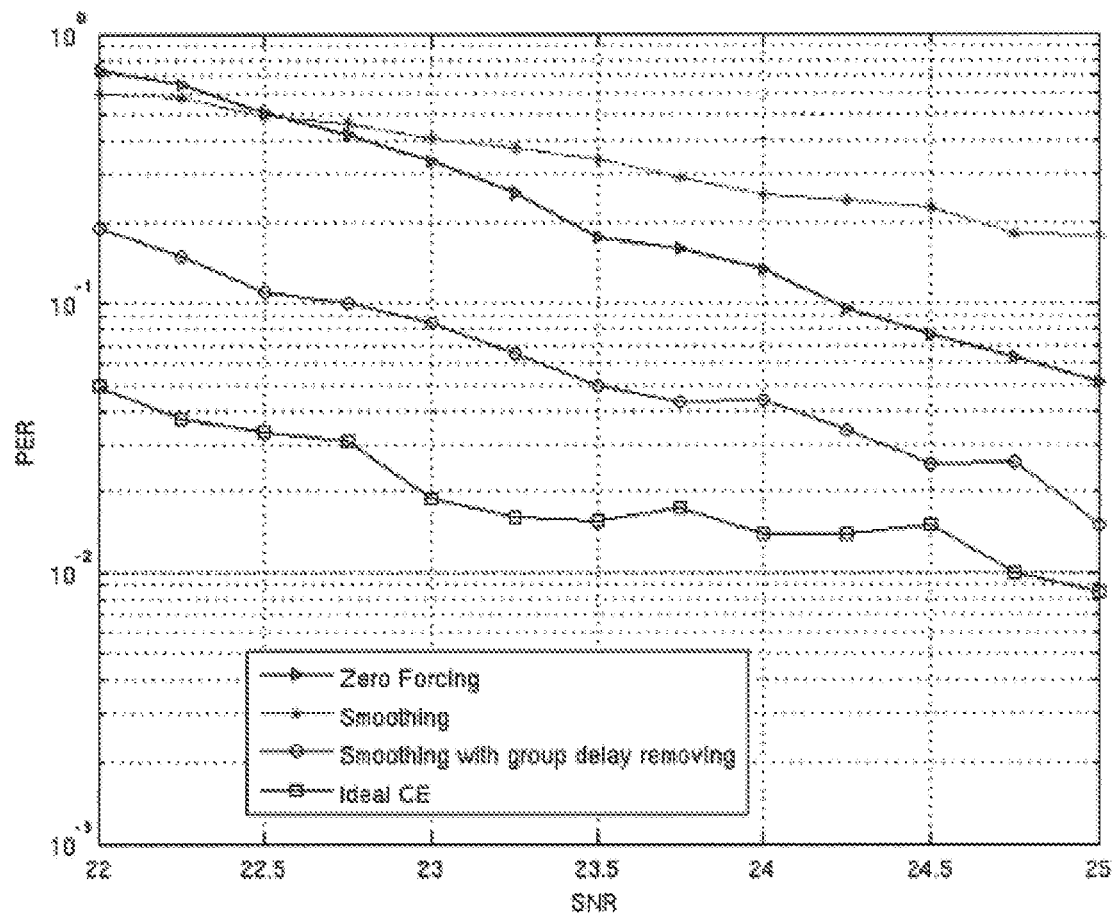
FIG. 12 shows simulation results for a 20 MHz VHT Modulation and Coding Scheme-7 (MCS7) packet, in a model B fading channel, according to an embodiment of the present invention.

(5) 2 spatial stream, 20 MHz VHT MCS7 packet, in a model B fading channel, with the results shown in FIG. 12.

As shown in FIG. 8, for a single transmitter and receiver chain, since the Matlab receiver has very good synchronization accuracy, the synchronization packet offset is small. Accordingly, the PER performance improvement with the embodiments of the present invention is small (less than 0.2 dB) when compared with direct smoothing. The embodiments of the present invention show about a 1.2 dB gain compared with a zero forcing channel estimation method.

Figure 9:
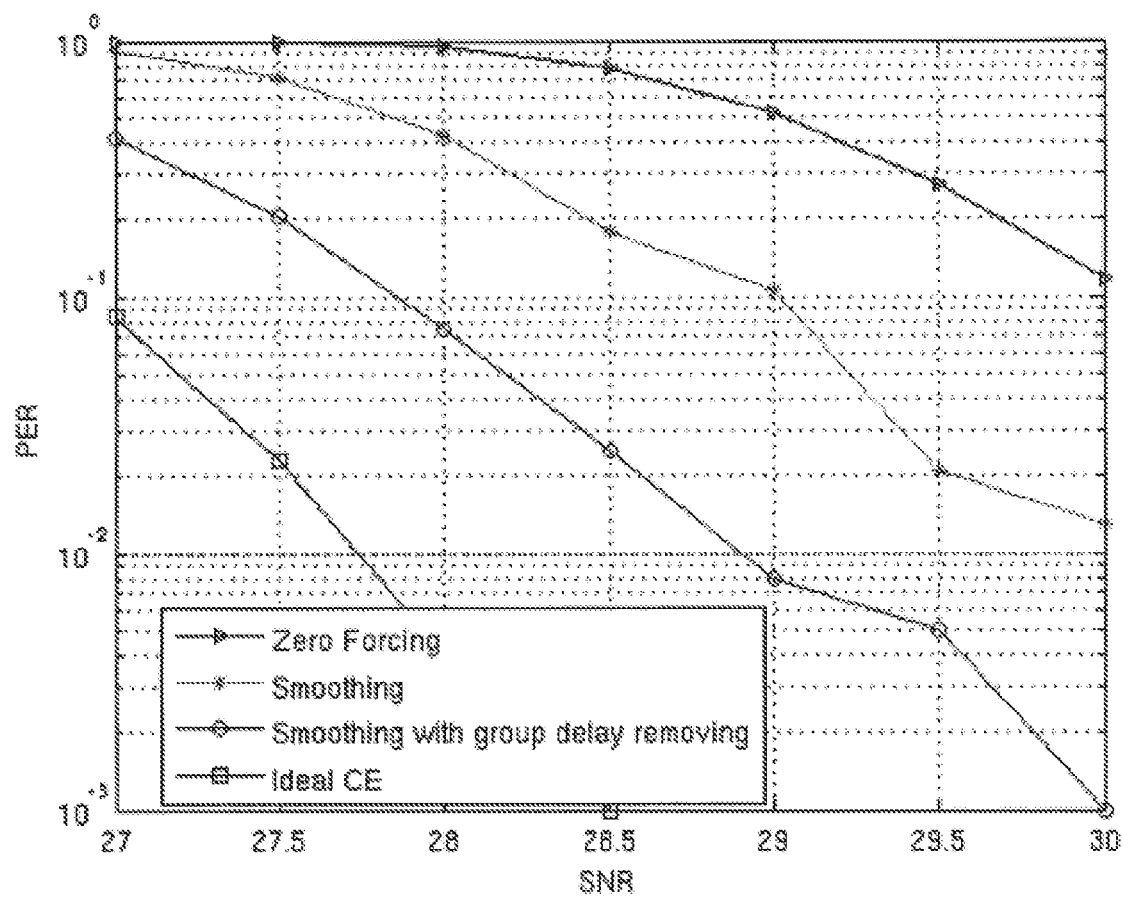
FIG. 9 shows packet error rate for an 80 MHz VHT Modulation and Coding Scheme-9 (MCS9) packet with Space-Time Block Coding (STBC), in an AWGN channel, according to an embodiment of the present invention.
Figure 10:
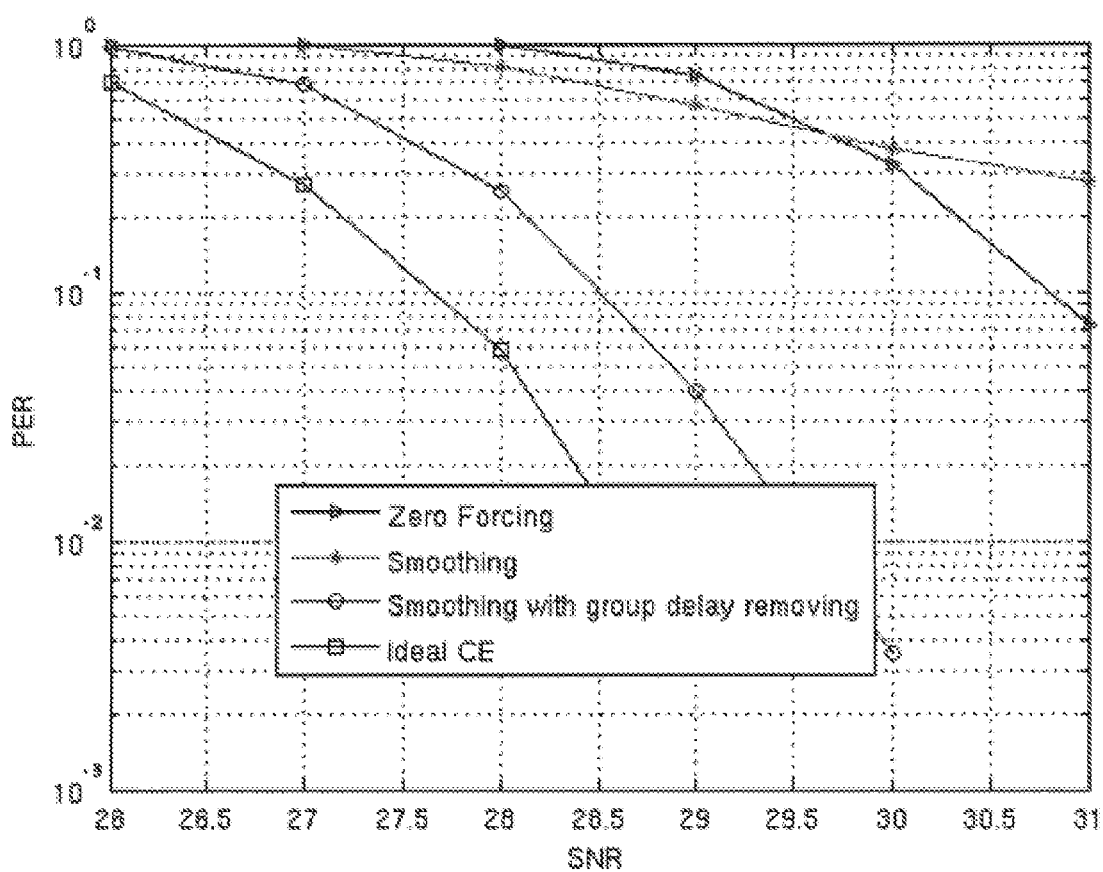
FIG. 10 shows packet error rate for a 2 spatial stream, 80 MHz VHT MCS9 packet, in an AWGN channel, according to an embodiment of the present invention.
Figure 11:
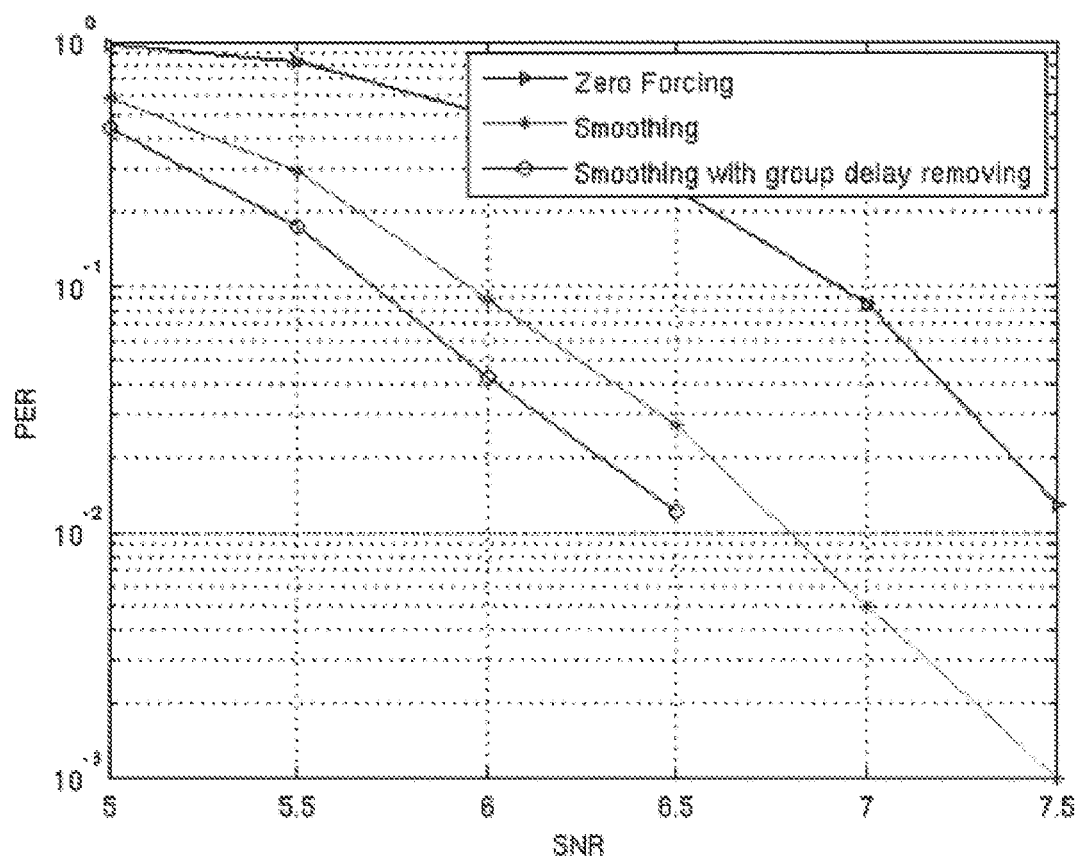
FIG. 11 shows packet error rate for a 2 spatial stream, 80 MHz VHT Modulation and Coding Scheme-0 (MCS0) packet, in an AWGN channel, according to an embodiment of the present invention.

However, with multiple transmit chains, the synchronization offset in the Matlab receiver can be large, due to the effect of cyclic shift applied to the chains. Accordingly, the embodiments of the present invention show significant improvement for a high SNR range (sensitivity improvement of 1 dB for STBC and over 2 dB for MIMO), as shown in FIGS. 9 and 10. When the SNR is moderately low, such as, for example, 5 to 7 dB, as shown in FIG. 11, the embodiments of the present invention still provide some, although a significantly smaller, sensitivity improvement, of about 0.3 dB.

FIG. 12 shows simulation results for a 20 MHz VHT MCS7 packet in a model B fading channel. The smoothing algorithm alone performs even worse than the zero forcing channel estimation method. However, embodiments of the present invention provide over a 1.5 dB gain in sensitivity.

Based on the above simulation results, the embodiments of the present invention show consistent performance improvement over the realizable alternatives, and implementation of embodiments of the present invention in hardware is straightforward.

Accordingly, embodiments of the present invention provide an efficient algorithm to estimate a packet bias from an optimal synchronization position. Sub-packet accuracy can then be achieved by refining the step resolution. The embodiments of the present invention work robustly under various SNRs, and hardware implementation complexity is low. A simple mean filter is then applied across sub-carriers to perform channel smoothing, further reducing the MSE in channel estimation and PER. The sensitivity is improved by about 1.5 dB for multiple transmit chains.

While the present invention has been particularly shown and described with reference to certain embodiments thereof, it will be understood by those of ordinary skill in the art that various changes in form and details may be made therein without departing from the spirit and scope of the present invention.

What is claimed is:

1. A method for receiving packets on a channel of an Orthogonal Frequency-Division Multiplexing (OFDM) system at an OFDM receiving apparatus, the method comprising the steps of:
estimating a time shift value for a packet using channel estimation and a Fast Fourier Transform (FFT) size;
adjusting a synchronization position of the packet on a channel using the estimated time shift value to generate an adjusted channel;
applying a filter across sub-carriers of the adjusted channel to generate a smoothed channel estimate; and
receiving, at a receiver of the OFDM receiving apparatus, packets on the channel in accordance with the smoothed channel estimate,
wherein the filter comprises a Finite Impulse Response (FIR) filter,
wherein a length of the FIR filter is based on a Signal to Noise Ratio (SNR) estimate for the channel, and wherein a short-length FIR filter is applied when the SNR estimate is greater than or equal to 12 dB, a long-length FIR filter is applied when the SNR estimate is less than or equal to 3 dB, and a medium-length FIR filter is applied when the SNR estimate is greater than 3 dB and less than 12 dB.

2. The method of claim 1, wherein the channel estimation comprises zero forcing channel estimation.

3. The method of claim 2, wherein the time shift value is estimated from within an allowed time offset.

4. The method of claim 3, wherein the time shift value is estimated using:

$$\tau_{opt} = \arg\max_{-\tau_{max} \leq \tau \leq \tau_{max}} \left| \sum_{k=-N/2}^{N/2-1} H_f^{ZF}(k) \exp\left(-j\frac{2\pi}{N}k\tau\right) \right|$$

where N is the FFT size, $H_f^{ZF}(k)$ is an initial zero forcing channel estimation, and $\tau$ and $\tau_{max}$ are the time shift value and the allowed time offset, respectively.

5. A method for receiving packets on a channel of an Orthogonal Frequency-Division Multiplexing (OFDM) system at an OFDM receiving apparatus, the method comprising the steps of:
estimating a time shift value for a packet using channel estimation and a Fast Fourier Transform (FFT) size;
estimating a channel with a corrected packet synchronization position using the channel estimation, the FFT size, and the estimated time shift value;
estimating a smoothed channel by applying a filter to the estimated channel; and
receiving, at a receiver of the OFDM receiving apparatus, packets on the channel in accordance with the estimated smoothed channel.

6. The method of claim 5, wherein the channel estimation comprises zero forcing channel estimation.

7. The method of claim 6, wherein the time shift value is estimated from within an allowed time offset.

8. The method of claim 6, wherein the filter comprises a Finite Impulse Response (FIR) filter.

9. The method of claim 8, wherein a length of the FIR filter is based on a Signal to Noise Ratio (SNR) estimate for the channel.

10. The method of claim 8, wherein a short-length FIR filter is applied when the SNR estimate is greater than or equal to 12 dB, a long-length FIR filter is applied when the SNR estimate is less than or equal to 3 dB, and a medium-length FIR filter is applied when the SNR estimate is greater than 3 dB and less than 12 dB.

11. The method of claim 7, wherein the time shift value is estimated using:

$$\tau_{opt} = \arg\max_{-\tau_{max} \leq \tau \leq \tau_{max}} \left| \sum_{k=-N/2}^{N/2-1} H_f^{ZF}(k) \exp\left(-j\frac{2\pi}{N}k\tau\right) \right|$$

where N is the FFT size, $H_f^{ZF}(k)$ is an initial zero forcing channel estimation, and $\tau$ and $\tau_{max}$ are the time shift value and the allowed time offset, respectively.

12. The method of claim 11, wherein the channel with the corrected packet synchronization position is estimated using:

$$H_f^{SA}(k) = \sum_{k=-N/2}^{N/2-1} H_f^{ZF}(k)\exp\left(-j\frac{2\pi}{N}k\tau_{opt}\right).$$

13. The method of claim 11, wherein the smoothed channel is estimated using:

$$H(k) = \widehat{H}(k)\exp\left(j\frac{2\pi}{N}k\tau_{opt}\right)$$

where:

$$\widehat{H}(k) = \sum_{m=1}^{M} h_m H_f^{SA}(k + m - (M+1)/2),$$

$$h_m = \begin{cases} [111111111]/9 & SNR \leq 3 \text{ dB} \\ [1111111]/7 & 3 \text{ dB} < SNR \leq 12 \text{ dB} \\ [11111]/5 & SNR > 12 \text{ dB} \end{cases}$$

and M is a length of the FIR filter.

14. An apparatus for receiving packets on a channel of an Orthogonal Frequency-Division Multiplexing (OFDM) system, comprising:
    a memory;
    at least one processor coupled to memory and operative to: estimate a time shift value for a packet using a channel estimation and a Fast Fourier Transform (FFT) size; estimate a channel with a corrected packet synchronization position using the channel estimation, the FFT size, and the estimated time shift value; and estimate a smoothed channel by applying a filter to the estimated channel; and
    a receiver coupled to the at least one processor and operative to receive packets on the channel in accordance with the estimated smooth channel.

15. An article of manufacture for receiving packets on a channel of an Orthogonal Frequency-Division Multiplexing (OFDM) system, comprising a non-transitory machine readable medium containing one or more programs, which when executed implement the steps of:
    estimating a time shift value for a packet using channel estimation and a Fast Fourier Transform (FFT) size;
    estimating a channel with a corrected packet synchronization position using the channel estimation, the FFT size, and the estimated time shift value;
    estimating a smoothed channel by applying a filter to the estimated channel; and
    receiving packets on the channel in accordance with the estimated smoothed channel.

\* \* \* \* \*